United States Patent
Childress et al.

(10) Patent No.: US 10,279,902 B2
(45) Date of Patent: May 7, 2019

(54) APPARATUS, SYSTEM, AND METHOD FOR FLYING AN AIRCRAFT

(71) Applicant: The Boeing Company, Chicago, IL (US)

(72) Inventors: Jamie J. Childress, Mercer Island, WA (US); Daniel J. Perron, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1022 days.

(21) Appl. No.: 14/500,691

(22) Filed: Sep. 29, 2014

(65) Prior Publication Data
US 2016/0090179 A1 Mar. 31, 2016

(51) Int. Cl.
*B64C 29/00* (2006.01)
*B64C 39/02* (2006.01)

(52) U.S. Cl.
CPC ........ *B64C 29/0091* (2013.01); *B64C 39/024* (2013.01); *B64C 2201/088* (2013.01)

(58) Field of Classification Search
CPC .... B64C 1/50; B64C 1/54; B64C 1/56; B64C 29/00; B64C 29/0091; B64C 37/02; B64C 39/00; B64C 39/022; B64C 39/024; B64C 2201/022; B64C 2201/024; B64C 2201/08; B64C 2201/082; B64C 2201/088; B64D 5/00
See application file for complete search history.

(56) References Cited

U.S. PATENT DOCUMENTS

| | | | | |
|---|---|---|---|---|
| 1,716,670 A * | 6/1929 | Sperry | ..................... | B64D 5/00 244/110 F |
| 1,792,738 A * | 2/1931 | Hall | ........................ | B64D 5/00 244/118.6 |
| 2,404,544 A * | 7/1946 | Stelzer | ................... | B64C 37/02 244/34 R |
| 2,843,337 A * | 7/1958 | Bennett | .................... | B64D 5/00 244/2 |
| 3,113,747 A * | 12/1963 | Smith | ..................... | B64D 5/00 244/3 |
| 3,298,633 A * | 1/1967 | Dastoli | ............... | B64C 29/0033 244/2 |
| 3,366,347 A * | 1/1968 | Soulez-Lariviere | ........................ | B64C 29/0033 244/137.1 |
| 3,796,398 A * | 3/1974 | Eilertson | ................ | B64D 17/80 244/139 |
| RE28,454 E * | 6/1975 | Fitzpatrick et al. | ...... | B64B 1/20 244/125 |

(Continued)

OTHER PUBLICATIONS

Saito et al.; Properties of tandem balloons connected by extendable suspension wires; Jul. 30, 2009; Elsevier Ltd.; Advances in Space Research 45 (2010) 482-489.*

(Continued)

*Primary Examiner* — Richard R. Green
*Assistant Examiner* — Michael A. Fabula
(74) *Attorney, Agent, or Firm* — Kunzler, PC

(57) ABSTRACT

An aircraft launch system includes a riser coupleable to an aircraft. The riser includes an actuator and a tether coupled to the actuator. The aircraft launch system further includes a sky crane coupled to the tether. The actuator is operable to retract the tether and draw together the sky crane and the aircraft.

25 Claims, 15 Drawing Sheets

(56) References Cited

U.S. PATENT DOCUMENTS

| | | | |
|---|---|---|---|
| 4,124,182 A * | 11/1978 | Loeb | F03D 5/00 244/153 R |
| 4,267,987 A * | 5/1981 | McDonnell | B64D 39/00 244/137.4 |
| 4,375,280 A * | 3/1983 | Nicolaides | B64C 31/024 244/13 |
| 4,378,919 A * | 4/1983 | Smith | B64D 1/22 244/118.1 |
| 4,500,056 A * | 2/1985 | Della-Moretta | B62D 53/0864 244/1 TD |
| 4,601,444 A * | 7/1986 | Lindenbaum | B64B 1/24 244/2 |
| 4,678,141 A * | 7/1987 | Sarrantonio | B64C 37/02 244/2 |
| 4,695,012 A * | 9/1987 | Lindenbaum | B64B 1/24 244/137.4 |
| 4,757,959 A * | 7/1988 | Schroder | B64D 3/00 244/137.4 |
| 4,967,984 A * | 11/1990 | Allen | B64C 3/385 244/229 |
| 5,026,003 A * | 6/1991 | Smith | B64B 1/60 244/127 |
| 5,096,141 A * | 3/1992 | Schley | B64B 1/24 244/125 |
| 5,901,924 A * | 5/1999 | Strieber | B64C 31/036 244/13 |
| 6,138,943 A * | 10/2000 | Huang | B60F 5/02 244/17.25 |
| 6,142,414 A * | 11/2000 | Doolittle | B64B 1/06 244/2 |
| 6,808,144 B1 * | 10/2004 | Nicolai | B64C 39/024 244/139 |
| 7,946,530 B1 * | 5/2011 | Talmage, Jr. | B64C 27/006 244/118.2 |
| 8,157,205 B2 * | 4/2012 | McWhirk | B64B 1/02 212/274 |
| 8,448,898 B1 * | 5/2013 | Frolov | B64C 39/024 244/59 |
| 8,950,698 B1 * | 2/2015 | Rossi | B64C 37/02 244/2 |
| 9,079,662 B1 * | 7/2015 | Duffy | B64C 37/02 |
| 9,139,279 B2 * | 9/2015 | Heppe | B64B 1/54 |
| 9,359,075 B1 * | 6/2016 | von Flotow | B64D 5/00 |
| 9,517,838 B1 * | 12/2016 | Howard | B64C 27/12 |
| 9,540,091 B1 * | 1/2017 | MacCallum | B64B 1/44 |
| 2005/0242237 A1 * | 11/2005 | Scott | B64C 7/00 244/118.1 |
| 2005/0242239 A1 * | 11/2005 | Scott | B64C 27/006 244/137.4 |
| 2006/0000945 A1 * | 1/2006 | Voss | B64B 1/60 244/97 |
| 2007/0102571 A1 * | 5/2007 | Colting | B64B 1/06 244/30 |
| 2007/0187547 A1 * | 8/2007 | Kelly | B64B 1/20 244/7 R |
| 2009/0078818 A1 * | 3/2009 | Zulkowski | B64B 1/32 244/30 |
| 2009/0152391 A1 * | 6/2009 | McWhirk | B64B 1/02 244/30 |
| 2009/0302149 A1 * | 12/2009 | Fuchs | B64C 37/02 244/2 |
| 2012/0037750 A1 * | 2/2012 | Dvoeglazov | B64C 27/20 244/17.17 |
| 2012/0234964 A1 * | 9/2012 | Heppe | B64B 1/00 244/2 |
| 2012/0234965 A1 * | 9/2012 | Heppe | B64C 37/02 244/2 |
| 2012/0312918 A1 * | 12/2012 | Heppe | B64B 1/00 244/30 |
| 2012/0312919 A1 * | 12/2012 | Heppe | B64B 1/00 244/30 |
| 2013/0037650 A1 * | 2/2013 | Heppe | B64C 37/02 244/2 |
| 2014/0021288 A1 * | 1/2014 | Elson | B64C 39/024 244/2 |
| 2014/0097289 A1 * | 4/2014 | Heppe | B64B 1/04 244/2 |
| 2014/0097301 A1 * | 4/2014 | DeBey | B64C 37/02 244/73 R |
| 2015/0008678 A1 * | 1/2015 | Goldstein | F03D 5/02 290/55 |
| 2015/0183520 A1 * | 7/2015 | Elson | B64D 5/00 244/2 |
| 2015/0314871 A1 * | 11/2015 | von Flotow | B64D 3/00 244/137.4 |
| 2016/0152339 A1 * | 6/2016 | von Flotow | B64D 5/00 244/2 |
| 2017/0158340 A1 * | 6/2017 | von Flotow | B64D 27/24 |
| 2017/0253350 A1 * | 9/2017 | von Flotow | B64F 1/02 |

OTHER PUBLICATIONS

Smith et al.; Optimum designs for superpressure balloons; Oct. 19, 2002; Elsevier Ltd.; Advances in Space Research 33 (2004) 1688-1693.*

Lynn, Peter; Tethered Free Flying Wings; Oct. 12, 2004; <http://web.archive.org/web/20050829141827/www.inet.net.nz/~cbrent/pete/>; 6 pages.*

* cited by examiner

APPARATUS, SYSTEM, AND METHOD FOR FLYING AN AIRCRAFT

FIELD

This disclosure relates generally to aircraft, and more particularly to vertically launching and vertically landing aircraft.

BACKGROUND

Some conventional aircraft, such as unmanned aerial vehicles, are configured to take-off and land vertically. Typically, these aircraft include thrust generators coupled to the aircraft. The thrust generators of the aircraft provide thrust for vertical take-offs and landings, as well as for horizontal flight between a vertical take-off and landing.

Generally, the thrust required to lift an aircraft during a vertical take-off or lower the aircraft during a vertical landing is greater than the weight of the aircraft. However, the thrust required to propel the aircraft during horizontal flight is generally less than half the weight of the aircraft, and may be less than twenty percent of the weight of the aircraft. Accordingly, the thrust required for vertical take-offs and landings of an aircraft is greater than the thrust required for horizontal flight between a vertical take-off and landing.

SUMMARY

The subject matter of the present application has been developed in response to the present state of the art, and in particular, in response to shortcomings of conventional aircraft configured for vertical take-offs and landings. One such shortcoming includes the additional weight, size, and energy associated with more powerful thrust generators that are necessary to meet the higher thrust requirement for vertical take-offs and landings.

The subject matter of the present application has been developed to provide an apparatus, system, and method that overcome at least some of the above-discussed shortcomings of prior art techniques. More particularly, in some embodiments, described herein are an apparatus, a system, and a method for flying an aircraft that reduces the weight, size, and energy of the thrust generators of the aircraft by utilizing a sky crane for vertical take-offs and landings.

According to one embodiment, an aircraft launch system includes a riser coupleable to an aircraft. The riser includes an actuator and a tether coupled to the actuator. The aircraft launch system further includes a sky crane coupled to the tether. The actuator is operable to retract the tether and draw together the sky crane and the aircraft.

In some implementations of the aircraft launch system, the sky crane includes a rigid wing. The rigid wing can include a plurality of thrust generators.

According to some implementations, the sky crane includes a parafoil. In certain implementations, the actuator retracts the tether at a rate between about 5 ft/s and about 15 ft/s. According to one implementation, the actuator includes a pneumatically-powered rack-and-pinion system. In some implementations, the tether includes a plurality of wires.

In another embodiment, an aircraft launch system includes an aircraft with at least one thrust generator. The aircraft launch system also includes a riser coupled to the aircraft. The riser includes an actuator and a tether coupled to the actuator. The aircraft launch system also includes a sky crane coupled to the tether. The actuator is operable to retract the tether and draw together the sky crane and the aircraft.

According to some implementations of the aircraft launch system, the aircraft further includes a power supply and a controller. The controller is operably coupled to the at least one thrust generator. In one implementation of the aircraft launch system, the aircraft includes a fuselage and landing gear rotatably coupled to the fuselage via a lazy susan bearing.

In some implementations of the aircraft launch system, the sky crane includes a rigid wing with a plurality of thrust generators. The aircraft can include wing lock operable to lock the rigid wing to the aircraft. An entirety of the thrust generators of the rigid wing may generate a maximum combined thrust greater than a weight of the rigid wing and less than a weight of the aircraft. The maximum combined thrust of the entirety of the thrust generators of the rigid wing may be between about 110% and about 130% of the weight of the rigid wing and between about 15% and about 20% of the weight of the aircraft.

According to some implementations of the aircraft launch system, the actuator retracts the tether at a rate above a threshold rate. The threshold rate corresponds with a combined downward acceleration force and vertical drag force of the aircraft and actuator being equal to a combined lift force and vertical drag force of the sky crane.

In one implementation of the aircraft launch system, the sky crane includes a parafoil, and the aircraft includes a collapser that collapses the parafoil. According to one implementation of the aircraft launch system, the at least one thrust generator of the aircraft is positionable to direct a wash of the first thrust generator vertically into the sky crane, and positionable to horizontally propel the aircraft. According to yet one implementation of the aircraft launch system, the aircraft includes a plurality of thrust generators, where an entirety of the thrust generators of the aircraft generate a maximum combined thrust less than a weight of the aircraft.

According to yet another embodiment, a method for flying an aircraft includes tethering a sky crane to the aircraft via a tether, positioning a sky crane in the air vertically above an aircraft on a ground surface, and retracting the tether to draw the sky crane and aircraft together and lift the aircraft above the ground surface.

In some implementations of the method, positioning the sky crane in the air includes extending the tether to allow the sky crane to lift upwardly away from the aircraft. According to an implementation, positioning the sky crane in the air may further include directing a wash from at least one thrust generator of the aircraft into the sky crane. According to one implementation, positioning the sky crane in the air comprises generating thrust from at least one thrust generator coupled directly to the sky crane. In yet one implementation, positioning the sky crane in the air includes lifting the sky crane with wind.

According to one implementation of the method, retracting the tether includes retracting the tether faster than a downward decent rate of the sky crane. In yet one implementation, the method also includes propelling the aircraft horizontally above the ground surface with the sky crane retracted to the aircraft. According to an implementation, the method further includes extending the tether to separate the sky crane from the aircraft and lower the aircraft to the ground surface with the aircraft vertically above the ground surface.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
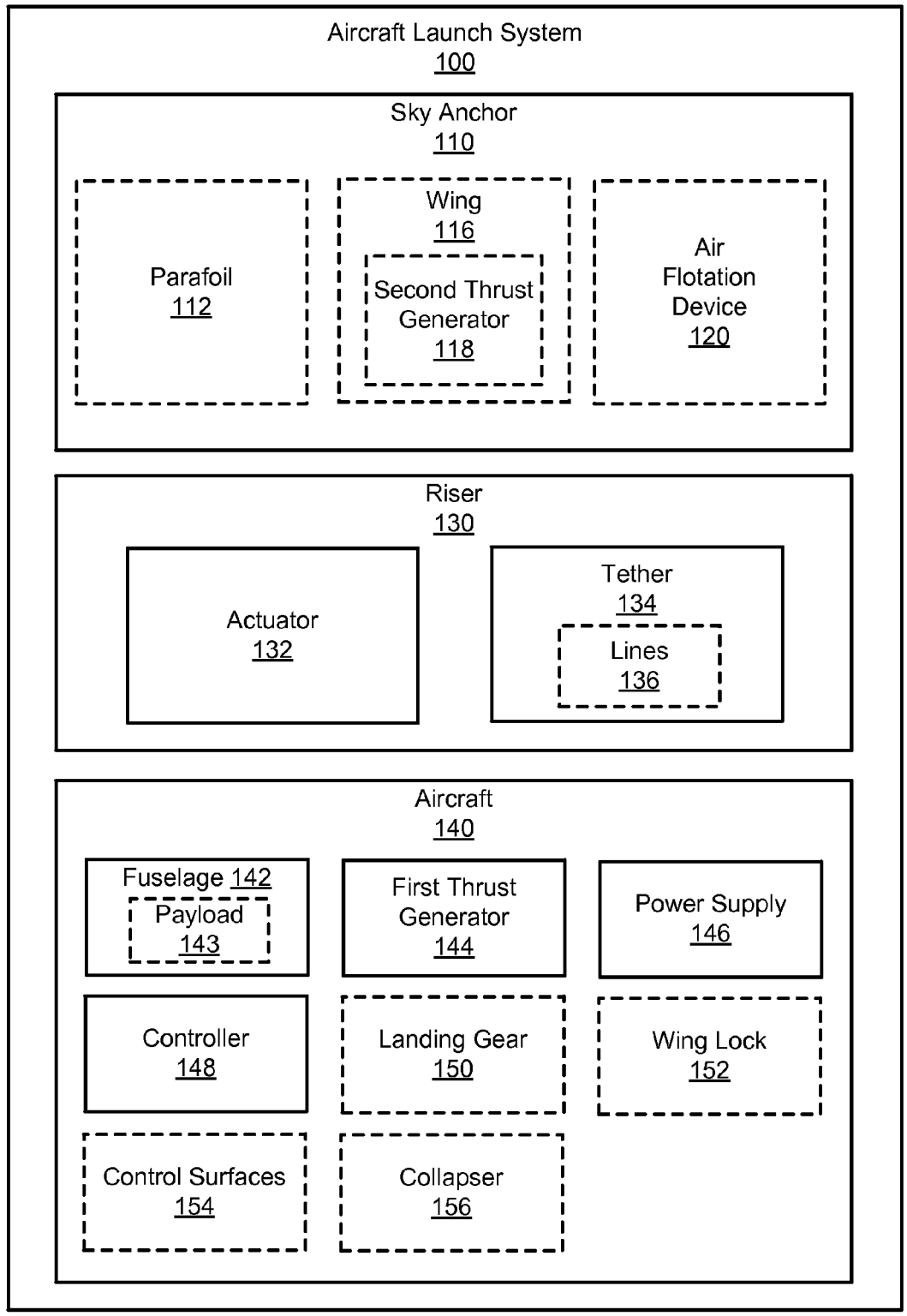
FIG. 1 is a schematic block diagram of an aircraft launch system according to one embodiment.

Referring to FIG. 1, and according to one embodiment, an aircraft launch system 100 includes a sky crane 110, riser 130, and an aircraft 140. Generally, the riser 130 couples the sky crane 110 to the aircraft 140. The riser 130 includes an actuator 132 and a tether 134. The tether 134 is coupled to the sky crane 110 at one end and the actuator 132 on an opposing end. Further, the actuator 132 is coupled directly to the aircraft 140. For launch operation of the aircraft 140, the sky crane 110 is positioned in the air vertically above the aircraft. The actuator 132 is operable to retract the tether 134. With the sky crane 110 positioned in the air and the aircraft positioned on a ground surface, the tether 134 is retracted to draw together the sky crane and the aircraft 140. The tether 134 is retracted at a rate faster than a downward descent of the sky crane 110. Accordingly, retraction of the tether 134 results in the aircraft 140 being lifted above the ground surface. Then, with the aircraft 140 lifted above the ground surface, one or more first thrust generators 114 of the aircraft 140 are activated to propel the aircraft horizontally forward for post-launch operation of the aircraft.

Figure 9:
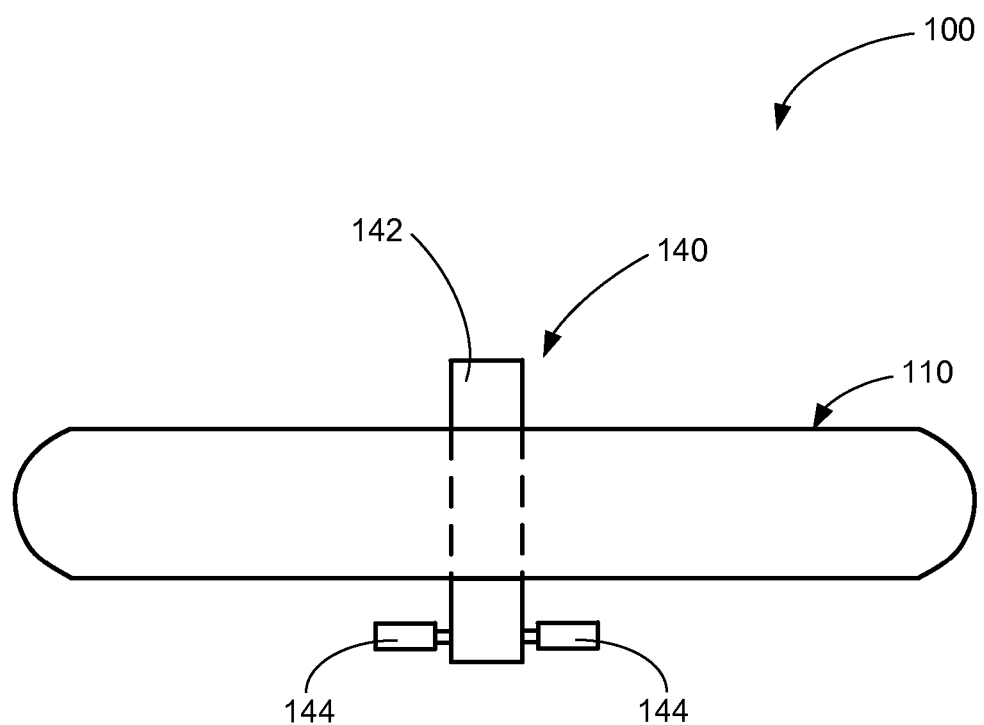
FIG. 9 is a top plan view of a schematic illustration of an aircraft launch system according to one embodiment.

The sky crane 110 is configured to enhance a downward drag and/or upward lift of the sky crane when supporting the aircraft 140. Therefore, the sky crane 110 has a planform area much greater than the planform area of the aircraft 140. In some implementations, the sky crane 110 may have a planform area that is at least between two times and ten times the planform area of the aircraft 140. For example, as shown in FIG. 9, the sky crane 110 has a planform area that is at least four times greater than the planform area of the aircraft 140. Additionally, the planform shape of the sky crane 110 can be substantially rectangular, triangular, circular, and the like. In some implementations, the sky crane drag force plus the sky crane lift force must be greater than the vertical drag of the fuselage. The required ratio of the sky crane vertical drag-plus-lift to the fuselage drag is a function of riser retraction speed and the mass of the fuselage. For one implementation, the drag-plus-lift profile of the sky crane is three to ten times the drag profile of the fuselage.

As an example, in one implementation, the sky crane 110 is a parafoil 112. The parafoil 112 is a non-rigid or flexible airfoil with an aerodynamic structure that is formed by wind flowing into the airfoil. The aerodynamic structure may include separate, isolated cells that fill up with air as the wind enters the cells. Further, after filling up the cells, wind forces the flexible material of the parafoil 112 into a defined drag-inducing shape, such as a partial cupped or parachute shape. Accordingly, the parafoil 112 is shaped to lift the parafoil 112 and enhance the downward drag of the parafoil when supporting a payload.

According to another example, in some implementations, the sky crane 110 is a wing 116. The wing 116 can be a rigid wing with an aerodynamic airfoil shape. The wing 116 is shaped not only to enhance the downward drag of the parafoil when supporting a payload, but also to induce a lift of the wing via air flow about the wing. The wing 116 includes first and second wingtips. In certain implementations, the wing 116 includes second thrust generators 118 between the first and second wingtips. The second thrust generators 118 are directly coupled to the wing 116. For example, in one implementation, the second thrust generators 118 are integrated into or formed in the wing 116.

The sky crane 110 can also be an air flotation device 120 in some implementations. The air flotation device 120 includes at least one sealed compartment filled with a gas, such as helium, that is lighter than air. The gas contained within the air flotation device 120 upwardly lifts the device. The air flotation device 120 may have a planform shape similar to the parafoil 112 and/or wing 116 to induce vertical drag, or may have another shape, such as spherical.

The aircraft 140 can be a manned or unmanned aerial vehicle. Propulsion for the aircraft 140 is provided by one or more first thrust generators 144 coupled to a fuselage 142 of the aircraft. The first thrust generators 144 are configured to generate thrust for post-launch flight, such as forward horizontal flight. Accordingly, in some implementations, the first thrust generators 144 collectively provide enough thrust for post-launch flight, but do not provide enough thrust for launch flight. For some aircraft, such as aerial vehicles designed for vertical take-offs and landings, the thrust required for post-launch flight is about the weight of the aircraft. The weight of the aircraft 140 includes any payload 143 coupled to or stored within the fuselage 142. However, for those same aircraft, launching the aircraft vertically upward into the air during launch flight, and landing the aircraft, is greater than the weight of the aircraft, including any payload 143. Because the first thrust generators 144 need not provide all the thrust for launching the aircraft 140, they can be smaller, lighter, and more efficient than thrust generators required to provide all the thrust for launching the aircraft. Moreover, due to the increase in vertical drag and/or lift provided by the sky crane 110 coupled to the aircraft 140 during post-launch flight, the thrust required by the first thrust generators 144 for post-launch flight of the aircraft is lower than the weight of the aircraft including payload. In one implementation, the thrust required by the first thrust generators 144 for post-launch flight of the aircraft is between about 15% and about 20% of the weight of the aircraft, including payload.

The first thrust generators 144 can be any of various thrust generators known in the art. For example, in one implementation, each first thrust generator 144 includes an electrically powered rotor. The aircraft 140 can include any number of first thrust generators 144. For example, the aircraft 140 may include one first thrust generator 144, or more than one first thrust generator, such as two, three, or more first thrust generators. Power for operating the first thrust generators 144 is provided by a power supply 146 coupled to or housed within the fuselage 142 of the aircraft 140. The power supply can be one or more electric batteries. In some implementations, the aircraft 140 includes a generator that charges the power supply 146.

The speed and thrust direction of the first thrust generators 144 control the speed and direction, respectively, of the aircraft 140. Control of the first thrust generators 144, such as the speed and thrust direction of the first thrust generators, is provided by a controller 148 coupled to or housed within the fuselage 142 of the aircraft 140. Further, control of the first thrust generators 144 by the controller 148 may be based on real-time flight commands received wirelessly from a remote location, and/or pre-stored flight commands or decision-making algorithms. Additional control of the speed and direction of the aircraft 140 may be provided by control surfaces 154 of the aircraft, which may include one or more of wing warping, flapperons, rudders, prop-wash thrust vanes, prop vectoring, and the like.

The aircraft 140 may include landing gear 150 coupled to the fuselage 142. The landing gear 150 is rotatably coupled to the fuselage 142 via a lazy susan bearing 151 in some embodiments (see, e.g., FIG. 2). The lazy susan bearing 151 allows the fuselage 142, riser 130, and sky crane 110 to freely rotate relative to the landing gear 150. In this manner, and in certain implementations, the lazy susan bearing 151 automatically "weathervanes" according to wind direction so that the sky crane 110 is properly positioned for receiving the wind and generating lift of the sky crane. The landing gear 150 may include any of various elements for engaging a ground surface. Such elements include wheels, absorbers, sleds, brakes, and the like. In the illustrated embodiment, the landing gear 150 includes a plurality of legs 153. The legs 153 may be flexible to absorb the impact of landing the aircraft 140.

Additionally, the aircraft 140 may include a wing lock 152 configured to securely couple the wing 116 to the aircraft. The wing lock 152 may securely engage a feature of the wing 116 when the tether 134 is fully retracted and the wing is drawn into close proximity of the aircraft 140. For example, in one implementation, the feature on the wing 116 may be a tab or other protrusion, and the wing lock 152 may be a movable latch that is movable into engagement with the tab to lock the wing to the aircraft 140, and movable out of engagement with the tab to allow the wing to separate from the aircraft.

According to some embodiments, the aircraft 140 includes a collapser 156 that collapses the parafoil 112 when the tether 134 is fully retracted and the parafoil is drawn into close proximity of the aircraft. The collapser 156 may collapse the parafoil 112 during post-launch flight of the aircraft 140. Alternatively, or additionally, the collapser 156 may collapse the parafoil 112 when the aircraft 140 is on the ground, such as during storage of the aircraft.

Figure 2:
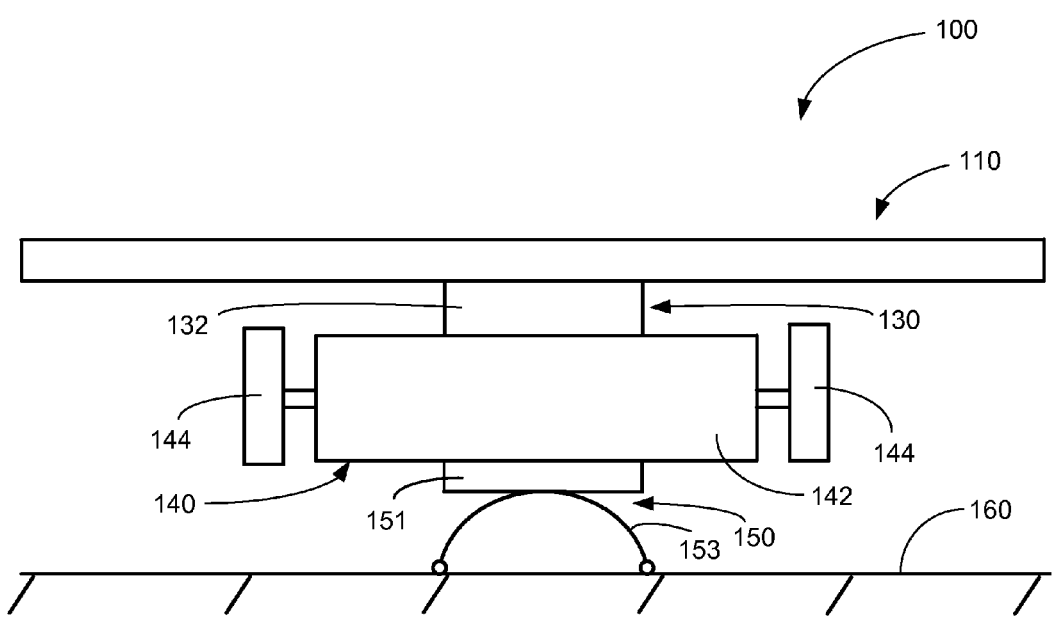
FIG. 2 is a side view of a schematic illustration of an aircraft launch system according to one embodiment shown in a pre-launch configuration.

Referring to FIG. 2, another embodiment of the aircraft launch system 100 is shown with the aircraft 140 positioned on a ground surface 160. The ground surface 160 can be any of various support surfaces capable of supporting the aircraft launch system 100, such as the ground itself, or an object on the ground, such as a platform, vehicle, and the like. The aircraft launch system 100 of FIG. 2 is configured in a pre-launch configuration. In the pre-launch configuration, the tether 134 of the actuator 132 is fully retracted and the sky crane 110 is in close proximity of the aircraft. Being in close proximity of the aircraft can be defined as abutting, adjoining, in contact with, or adjacent to the aircraft. With the aircraft launch system 100 in the pre-launch configuration, the system is ready for an aircraft launch operation, which can be divided into an extension launch operation and a retraction launch operation.

Figure 3:
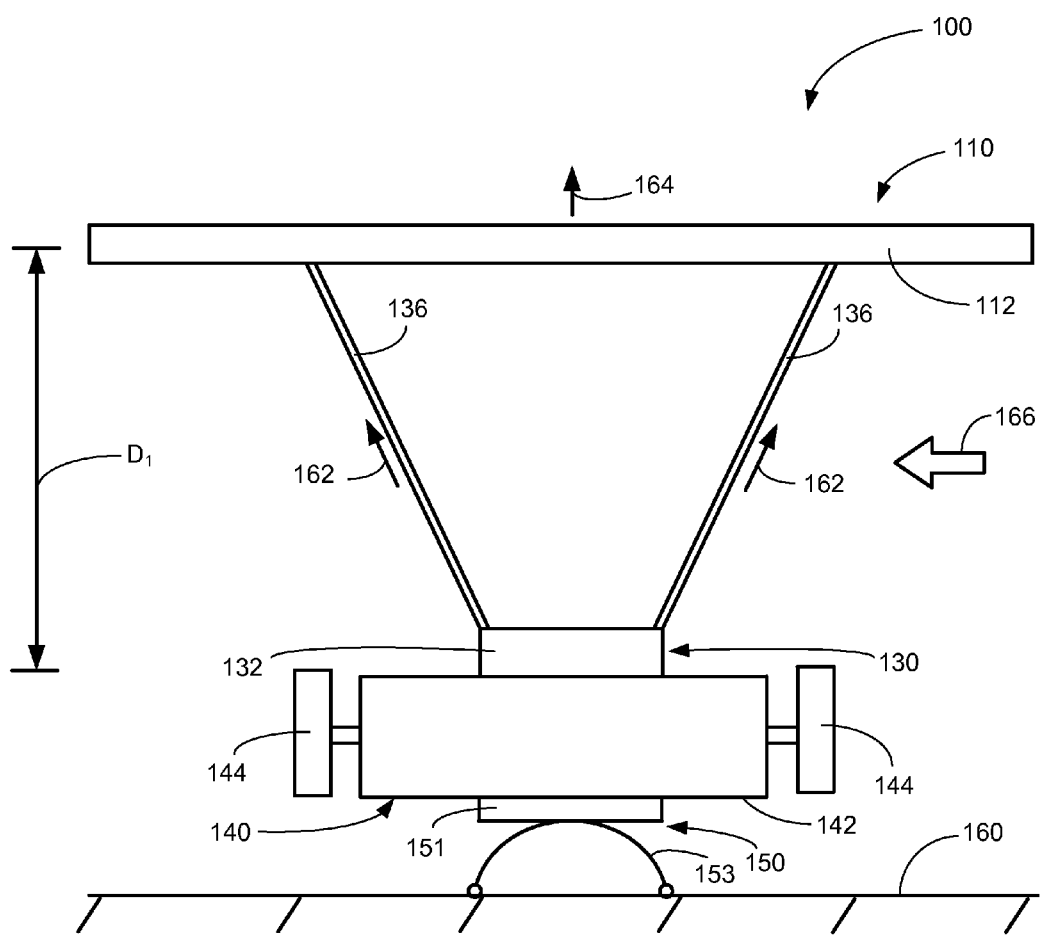
FIG. 3 is a side view of a schematic illustration of an aircraft launch system according to one embodiment shown in an extension launch configuration.
Figure 4:
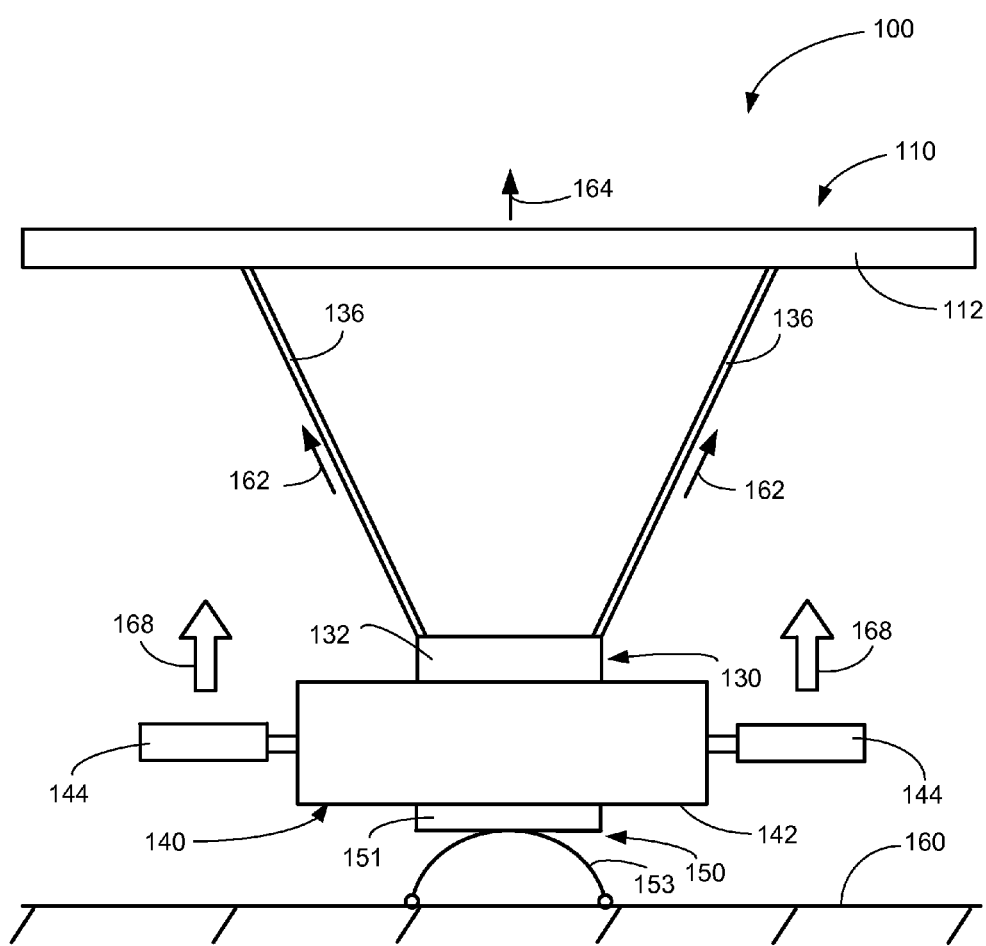
FIG. 4 is a side view of a schematic illustration of an aircraft launch system according to another embodiment shown in an extension launch configuration.
Figure 5:
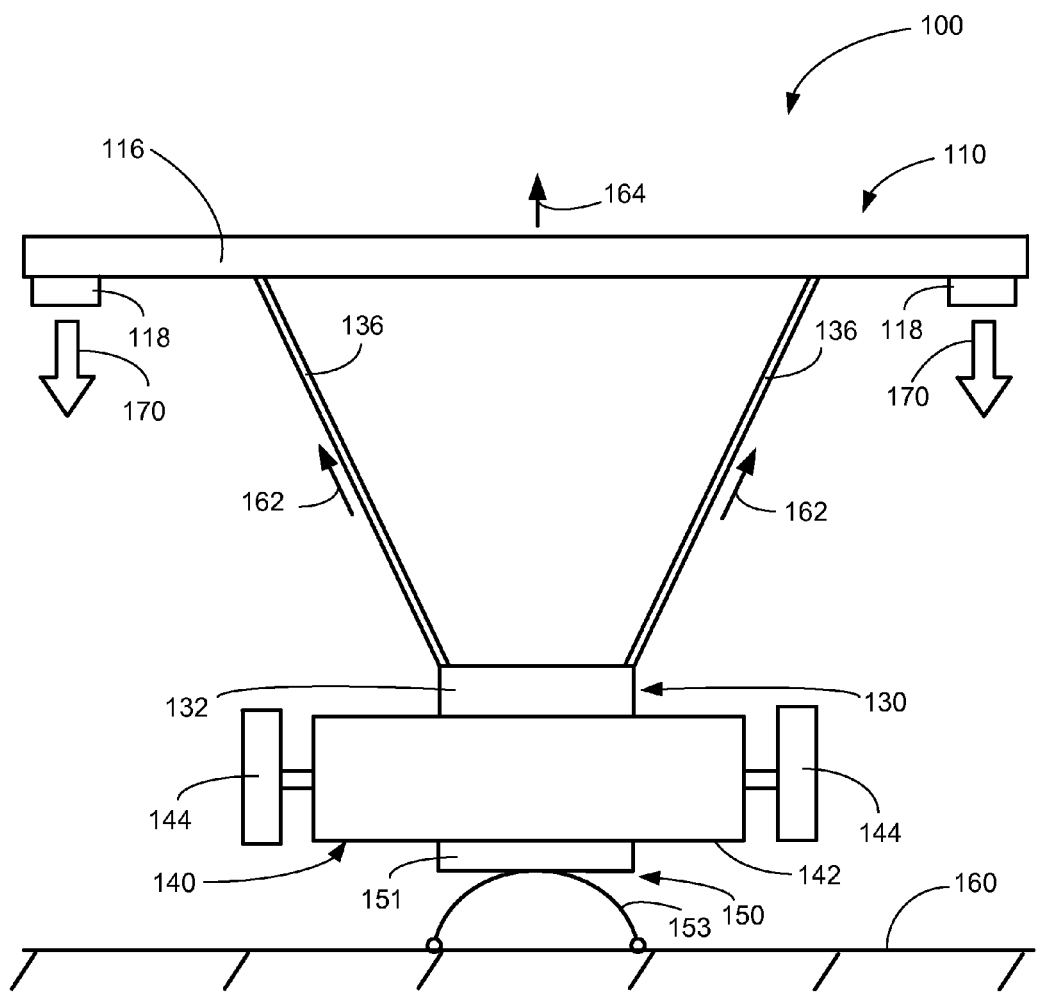
FIG. 5 is a side view of a schematic illustration of an aircraft launch system according to yet another embodiment shown in an extension launch configuration.

FIGS. 3-5 illustrate various embodiments of the aircraft launch system 100 in respective extension launch configurations for executing an extension launch operation. In each extension launch configuration, the sky crane 110 is being positioned in the air vertically above the aircraft 140, as indicated by direction 164, while the aircraft remains positioned on the ground surface 160. As shown, the sky crane 110 is positioned a distance $D_1$ vertically above the aircraft. As an example, the distance $D_1$ can be between about 10 feet and about 30 feet. As defined herein, the sky crane 110 is positioned vertically above the aircraft 140 when the sky crane is at a height relative to the ground surface 160 that is greater than the height of the aircraft relative to the ground surface. In other words, the sky crane 110 need to be positioned directly above, or be vertically aligned with, the aircraft 140 to be considered vertically above the aircraft. In the extension launch configuration of each embodiment, the actuator 132 is actuating to extend the lines 136 in the directions 162 to allow the sky crane 110 to lift upwardly away from the aircraft 140 while still remaining tethered to the aircraft. Notwithstanding the similarities of the embodiments of the aircraft launch system 100 in the extension launch configuration, the embodiments vary in the features and techniques employed to position the sky crane 110 in the air vertically above the aircraft 140.

According to the embodiment of FIG. 3, the parafoil 112 is positioned in the air vertically above the aircraft 140 using wind 166. The wind 166 impacts the parafoil 112 and causes the parafoil to form into an aerodynamic structure. Then, the wind 166 induces an upward lifting force on the parafoil 112, which results in the parafoil rising above the aircraft as the lines 136 are extended. The lazy susan bearing 151 allows the parafoil 112 to rotate to face the wind 166, which enhances the lifting of the parafoil by the wind. Although the sky crane 110 of the aircraft launch system 100 of FIG. 3 is described as a parafoil 112, it is recognized that under sufficient wind conditions, the sky crane 110 of FIG. 3 could be a wing 116, which is lifted by the wind 166 in the same manner as the parafoil.

According to the embodiment of FIG. 4, the parafoil 112 is positioned in the air vertically above the aircraft 140 using the prop-wash 168 of the first thrust generators 144 of the aircraft. The first thrust generators 144 are oriented to substantially face the ground surface 160, which generates a downwardly directed force onto the aircraft to effective urge the aircraft 140 into the ground surface 160. However, the prop-wash 168 resulting from operation of the first thrust generators 144 in this orientation is directed upwardly into the parafoil 112. The prop-wash 168 impacting the parafoil 112 in this manner causes the parafoil to form into an aerodynamic structure much like the wind 166 impacting the parafoil 112 as described above. Then, the prop-wash 168 induces an upward lifting force on the parafoil 112, which results in the parafoil rising above the aircraft as the lines 136 are extended. Although wind 166 is not shown in FIG. 4, it is recognized that wind 166 may be used to aid the rise of the parafoil 112 above the aircraft 140 along with the prop-wash 168. Further, it is also recognized that the prop-wash 168 may sufficient enough to lift a wing 116. Accordingly, in some embodiments, the parafoil 112 of FIG. 4 can be replaced with the wing 116.

Figure 11:
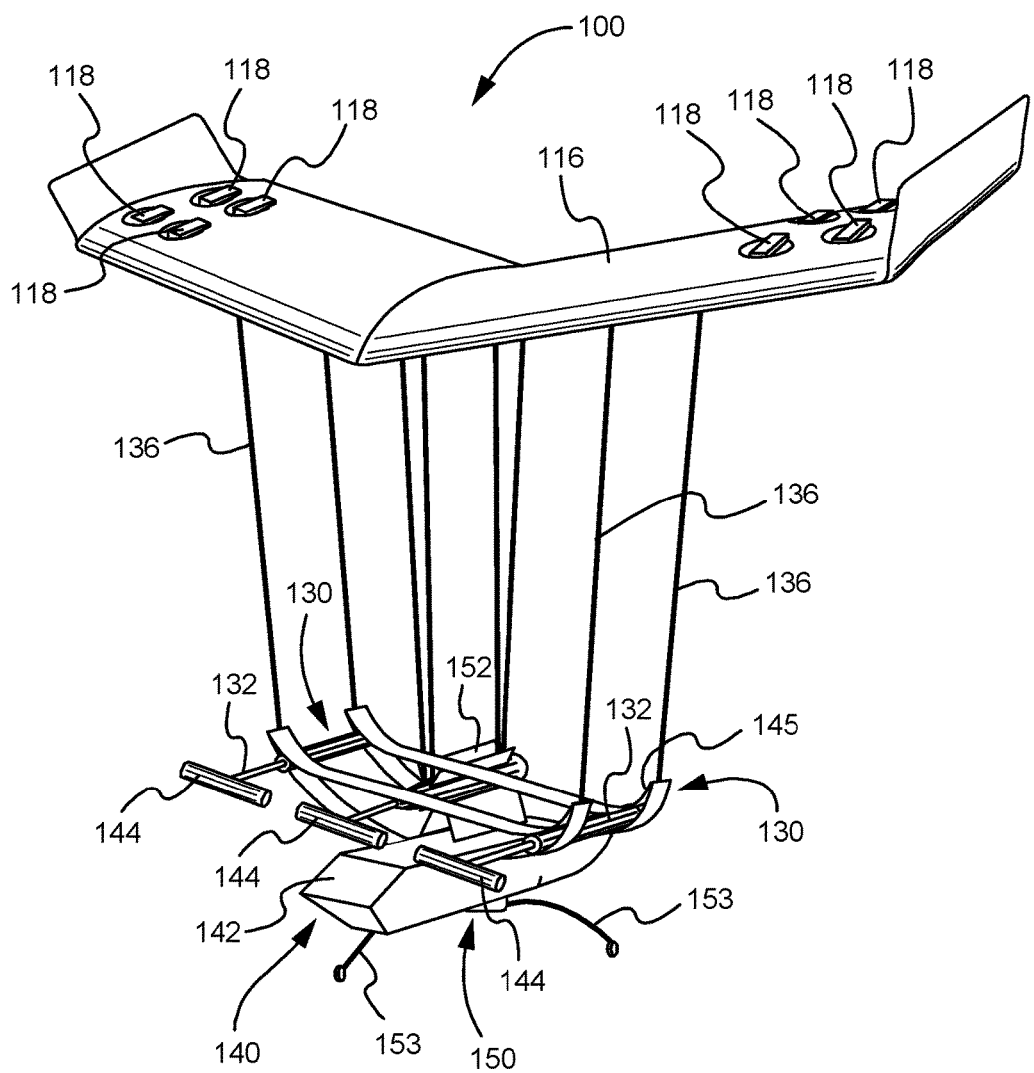
FIG. 11 is a perspective view of one embodiment of an aircraft launch system with a wing-type sky crane.

Now referring to the embodiment of FIG. 5, the wing 116 is positioned in the air vertically above the aircraft 140 using the thrust generated by the second thrust generators 118 coupled to the wing. The second thrust generators 118 can be any of various thrust generators known in the art. For example, in one implementation, each second thrust generator 118 includes an electrically powered rotor. The wing 116 can include any number of second thrust generators 118. For example, the wing 116 may include one second thrust generator 118, or more than one second thrust generator. As shown in FIG. 11, the wing 116 may include four second thrust generators 118 on one side of the wing, and four second thrust generators 118 on an opposing side of the wing.

The second thrust generators 118 are oriented relative to the wing 116 to generate thrust in an upward direction (e.g., direction 164), which results in a prop-wash 170 in a downward direction. In other words, the downwardly directed prop-wash 170 of the second thrust generators 118 propels the wing 116 in an upwardly direction. The operation (e.g., speed and/or orientation) of the second thrust generators 118 may be separately controlled to provide stability to the wing 116 while lifting the wing. Additionally, the wing 116 may include various control surfaces (e.g., flaps, aileron, spoilers, winglets, etc.) to aid in controlling and stabilizing the wing during lifting. Because the second thrust generators 118 need only lift the wing 116, which is lighter, and can be much lighter, than the aircraft 140, the second thrust generators 118 need only provide enough thrust to lift the wing. Accordingly, the maximum combined thrust of the entirety of the second thrust generators 118 of the wing 116 is between about 110% and about 130% of the total weight of the wing and between about 15% and about 20% of the weight of the aircraft 140, including payload 143 and the actuator 132. Moreover, although not shown, in some embodiments, the wind 166 and/or prop-wash 168 of the first thrust generators 144 may be used to aid the rise of the wing 116 above the aircraft 140 in addition to the second thrust generators 118.

With the sky crane 110 positioned in a desired distance $D_1$ vertically above the aircraft 140 on the ground surface 160, the aircraft launch operation of the system 100 can transition from the extension launch operation to the retraction launch operation. Generally, the retraction launch configuration for executing the retraction launch operation is the same even for embodiments with different extension launch configurations. In other words, regardless of how the extension launch operation is executed, whether by wind 166, prop-wash 168 of first thrust generators 144, or thrust of second thrust generators 118, once the sky crane 110 is positioned in the desired distance $D_1$ vertically above the aircraft 140, the retraction launch operation is executed in the same way.

Figure 6:
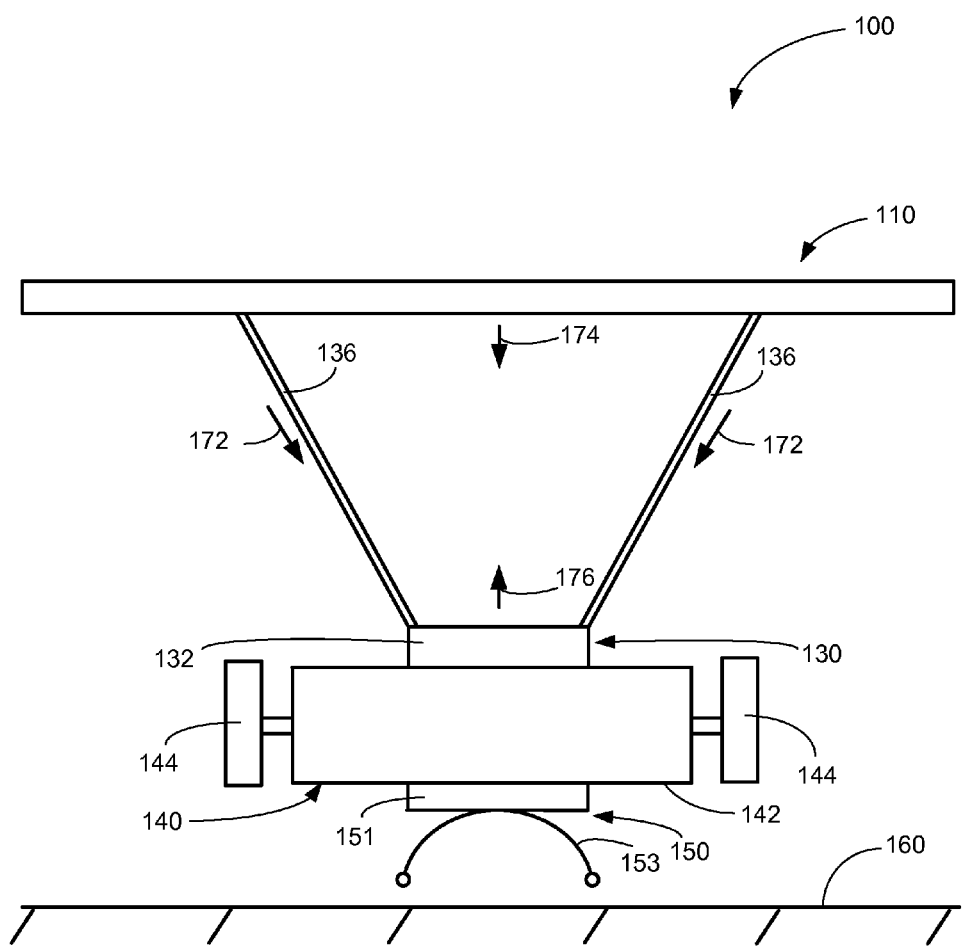
FIG. 6 is a side view of a schematic illustration of an aircraft launch system according to one embodiment shown in a retraction launch configuration.
Figure 7:
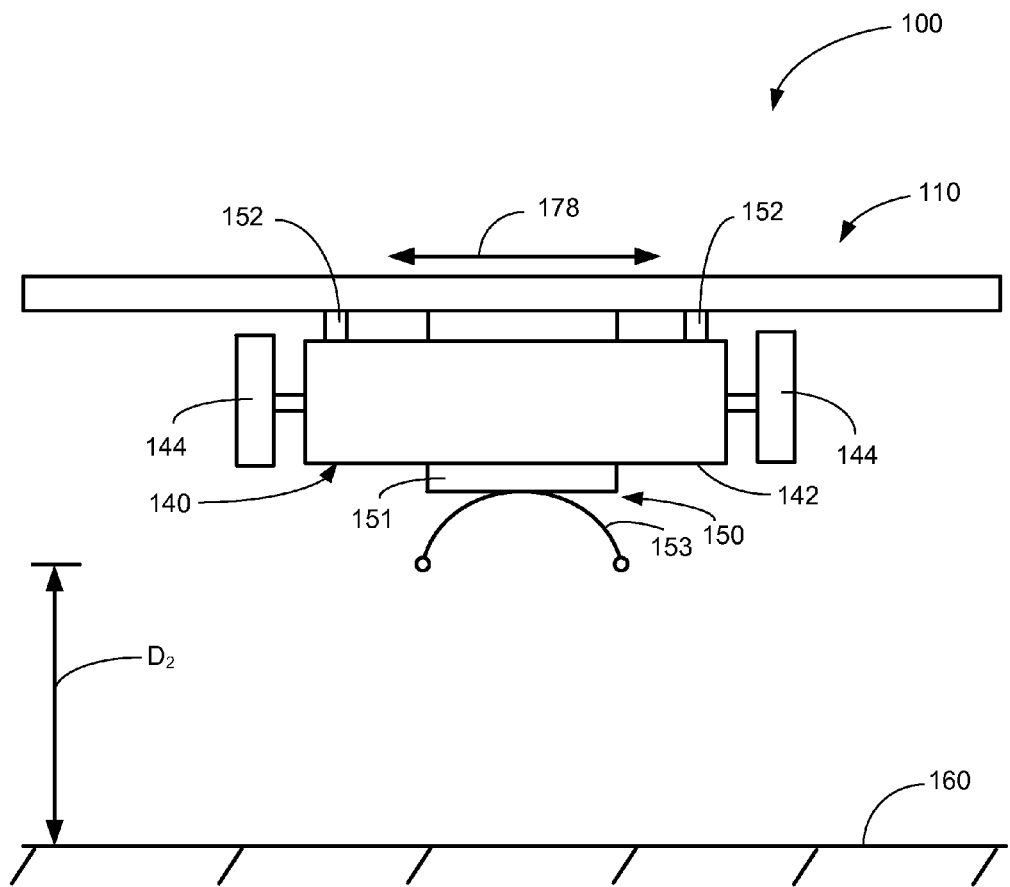
FIG. 7 is a side view of a schematic illustration of an aircraft launch system according to another embodiment shown in a horizontal flight configuration.
Figure 12:
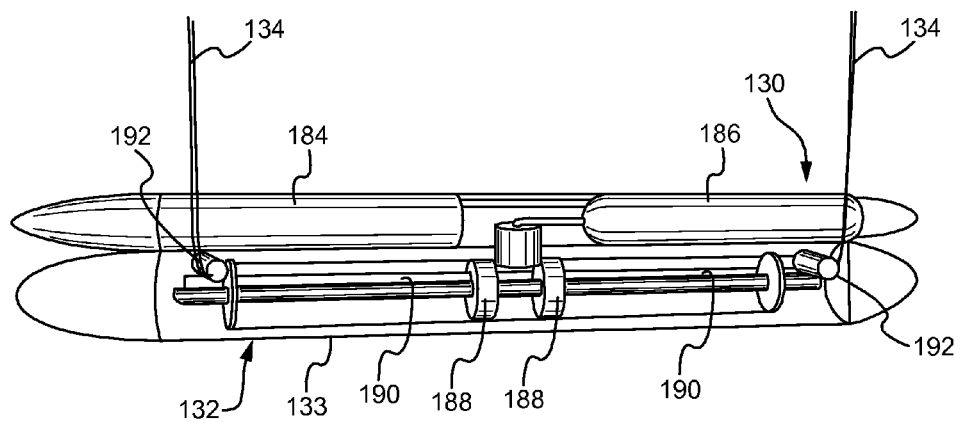
FIG. 12 is a partial cross-sectional perspective view of one embodiment of a riser of an aircraft launch system in a first configuration.
Figure 13:
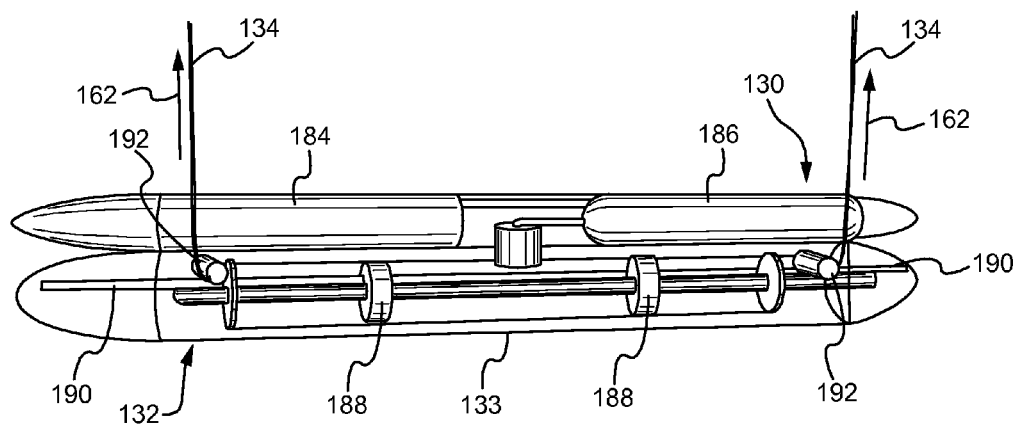
FIG. 13 is a partial cross-sectional perspective view of the riser of FIG. 12 in a second configuration.

Referring to FIG. 6, the retraction launch operation includes rapidly retracting the tether 134, or lines 136, into the actuator 132 at a rate that is faster than the downward decent rate of the sky crane 110. As shown, the actuator 132 is operated to retract the lines 136 in the direction 172. In one implementation, the retracted lines 136 are collected within the actuator 132. For example, one particular embodiment of the actuator 132 is shown in FIGS. 12 and 13, which will be described below in more detail. As the lines 136 are retracted, the aircraft 140 is lifted off of the ground surface 160, and the load (e.g., weight or mass) of the aircraft 140 and actuator 132 is transferred from the ground surface 160 to the lines 136. The load placed on the lines 136 effectively applies a downwardly directed force to the sky crane 110 to urge the sky crane downwardly in the direction 174 at a rate dependent upon the load and vertical drag of the aircraft 140 and actuator 132, the vertical drag of the sky crane 110, and the lift of the sky crane 110. When the rate of retraction of the lines 136 is above a first threshold, or a rate that is faster than the rate at which the sky crane descends, the aircraft 140 will lift or rise in the direction 176 into the air above the ground surface 160. Assuming the mass and vertical drag of the aircraft 140, and the vertical drag and lift of the sky crane 110, remain relatively constant, the rate of ascension of the aircraft 140 depends mainly on the rate of retraction of the lines 136. Generally, the faster the rate of retraction of the lines 136, the faster the rate of ascension of the aircraft 140. In one particular implementation, the rate of retraction of the lines 136 during the retraction launch operation is between about 50 ft/s and about 75 ft/s.

The aircraft 140 is raised in the direction 176 until the lines 136 are fully retracted and/or the aircraft is positioned a desired distance $D_2$ above the ground surface 160 (see, e.g., FIG. 6). As an example, in one implementation, and based on the retraction rate, the aircraft 140 is lifted off of the ground surface 160 to a height of between about 10 feet and about 30 feet in between about 0.3 seconds and about 0.5 seconds. In one embodiment, the rate of retraction of the lines 136 is selected, in view of the weight, drag, and lift parameters of the sky crane 110 and aircraft 140, such that the aircraft 140 is positioned at the desired distance $D_2$ as soon as or very close to when the wires become fully retracted. In other embodiments, the aircraft 140 may reach the desired distance $D_2$ before the wires become fully retracted, or it may be desirable in some embodiments to not fully retract the wires.

The desired distance $D_2$ is based on a desired vertical take-off point for normal, post-launch, or horizontal flight of the aircraft 140. The desired vertical take-off point may be dependent upon the characteristics of the aircraft 140, including the weight of the aircraft and thrust capability of the first thrust generators 144 of the aircraft. As the aircraft 140 may descend upon initiation of horizontal flight, the desired distance $D_2$ is selected to provide enough vertical clearance to allow the first thrust generators 144 to transition the aircraft 140 from a relatively stationary position above the ground following the launch operation to horizontal flight in a horizontal direction 178 without interfering with or impacting the ground surface 160 or other objects. In one implementation, the desired distance $D_2$ is between about 10 feet and about 30 feet. Because the sky crane 110 may provide some loft during horizontal flight, the first thrust generators 144 need only provide a cumulative thrust between about 20% and about 25% of the total weight of the aircraft 140 during horizontal flight in some embodiments.

Figure 8:
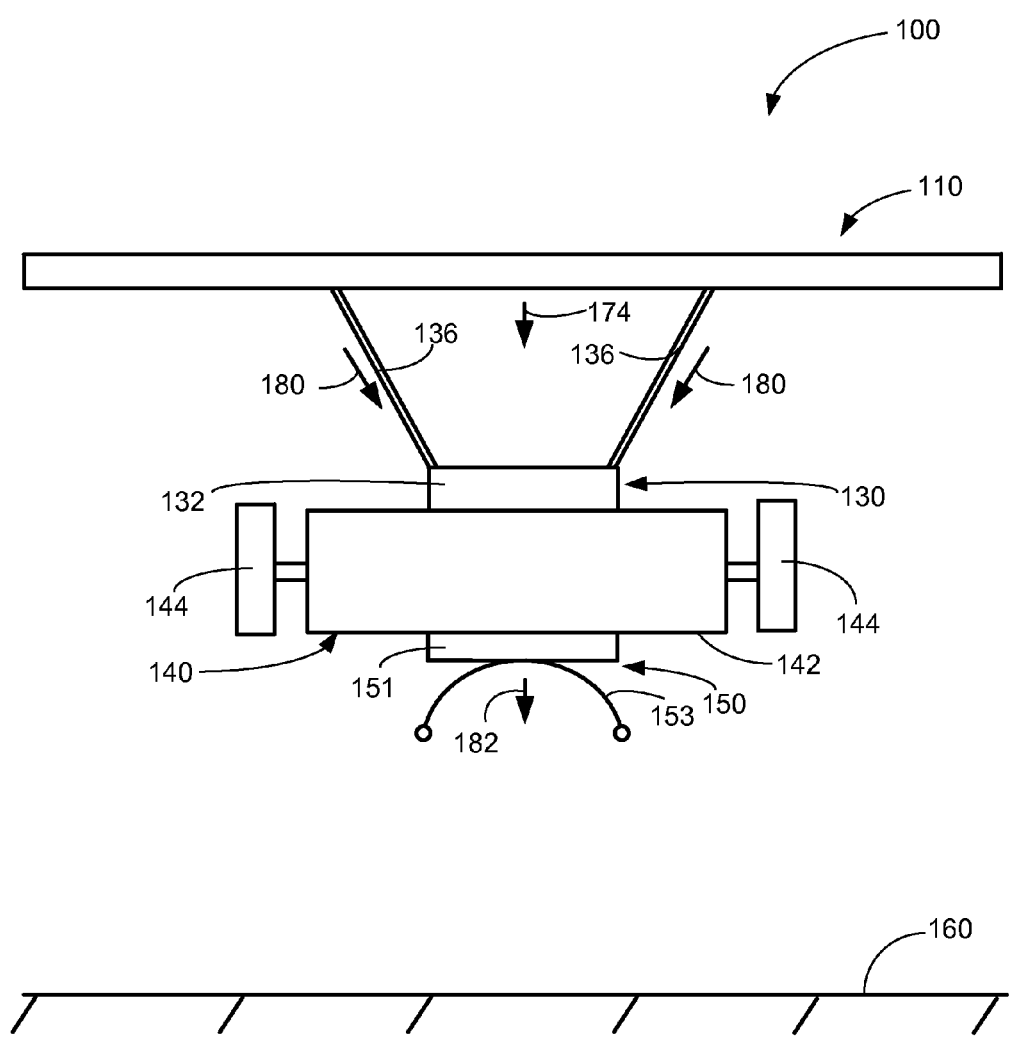
FIG. 8 is a side view of a schematic illustration of an aircraft launch system according to another embodiment shown in a landing configuration.

Referring to FIG. 8, in some embodiments, the aircraft launch system 100 may also be used to land the aircraft 140 on the ground surface 160 during a landing operation. The landing operation includes extending the lines 136 using the actuator 132 while the aircraft 140 is positioned vertically in the air. The aircraft 140 may or may not be moving horizontally via thrust from the first thrust generator 144 while the lines 136 are being extended. After the lines 136 are extended, the lines are retracted in the direction 180 to draw the sky crane 110 and aircraft 140 together. While the lines 136 are being retracted, the sky crane 110 is descending in the direction 174. Moreover, the rate of retraction of the lines 136 is selected such that the aircraft 140 also is descending in the direction 182. The rate of retraction of the lines 136 during the landing operation is slower than the rate of retraction of the lines during the launching operation. More specifically, the rate of retraction of the lines 136 is selected to such that the downward decent rate of the sky crane 110 is just greater than the retraction rate of the lines 136. In some implementations, the rate of retraction of the lines 136 during landing is below the first threshold rate described above. The slight difference in the downward decent rate of the sky crane 110 and the retraction rate of the lines 136 results in a slow downward decent rate of the aircraft 140 conducive to landing. The timing of the retraction of the lines 136 during landing is selected such that the aircraft 140 lands on the ground surface 160 while the aircraft is experiencing the slow downward decent rate. Additionally, in some implementations, the timing of the retraction of the lines 136 during landing is selected such that the aircraft 140 lands at the same time as, or near, the aircraft 140 landing on the ground surface 160.

Figure 10:
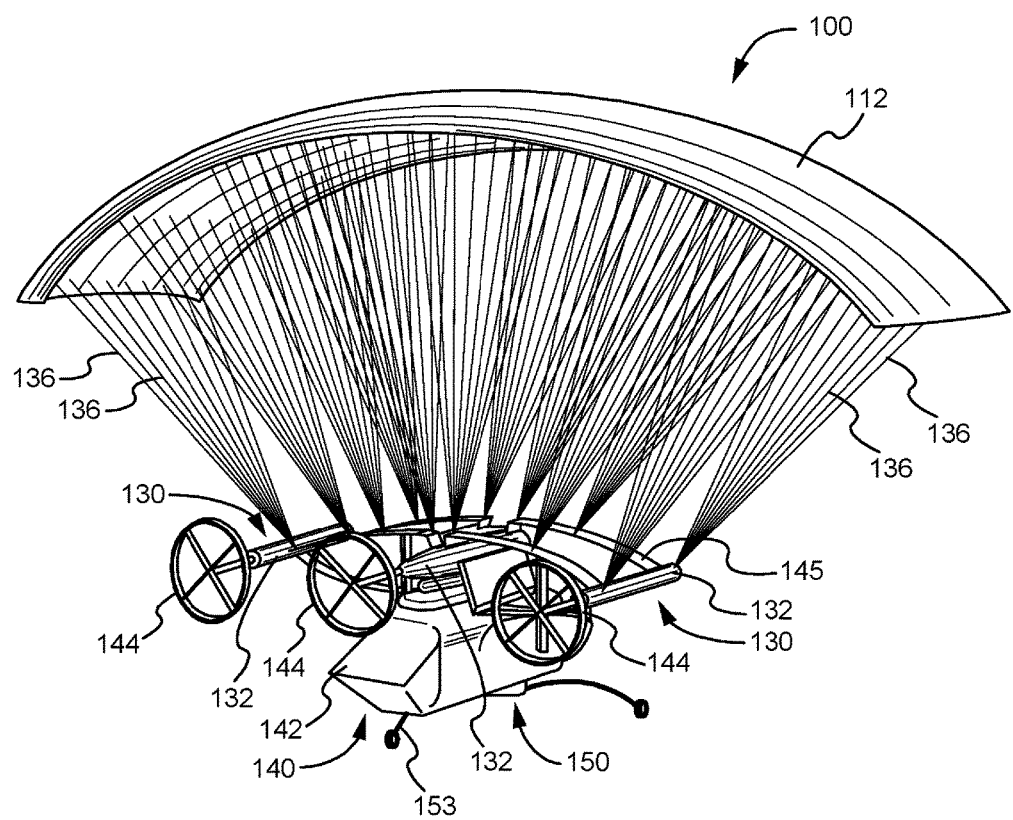
FIG. 10 is a perspective view of one embodiment of an aircraft launch system with a parafoil-type sky crane.

One specific embodiment of the aircraft launch system 100 utilizing a parafoil 112 is shown in FIG. 10. The parafoil 112 is coupled to a plurality of actuators 132 via a plurality of lines 136. The actuators 132 are coupled to the fuselage 142 of the aircraft 140 via a wing cradle 145 or coupled directly to the fuselage. The fuselage 142 can be a substantially elongate body having a hollow interior. Further, the fuselage 142 may include a storage compartment within which a payload 143 can be stored. The aircraft 140 of FIG. 10 includes three first thrust generators 144 each adjustably coupled to the fuselage 142 to change the direction of the thrust generated by the first thrust generators.

Another specific embodiment of the aircraft launch system 100 utilizing a wing 116 is shown in FIG. 11. The wing 116 is a rigid wing with a plurality of second thrust generators 118 formed in opposing sides of the wing. The wing 116 also is coupled to a plurality of actuators 132 via a plurality of lines 136. The aircraft 140 of FIG. 10 includes a wing lock 152 that engages a feature on the wing 116 to lock the wing to the aircraft. When locked to the aircraft 140, the wing 116 may be supported on a wing cradle 145. The aircraft 140 of FIG. 11 also includes three first thrust generators 144 each adjustably coupled to the fuselage 142 to change the direction of the thrust generated by the first thrust generators.

The actuator 132 of the riser 130 is configured to quickly retract a tether 134 coupled to the actuator. The actuator 132 can be electrically-powered, hydraulically-powered, and/or pneumatically-powered. According to one embodiment shown in FIGS. 12 and 13, the actuator 132 is pneumatically-powered by a compressed gas stored in a plenum 186. The compressed gas is supplied to the plenum 186 by a compressor 184. The compressed gas in the plenum is metered into a chamber housing one or more pistons 188. The compressed gas pressurizes the chamber, which drives the pistons 188 translationally along the chamber from a first position (see, e.g., FIG. 12) to a second position (see, e.g., FIG. 13). The chamber can be defined by a housing 133 of the actuator.

The actuator 132 includes a rack-and-pinion system with a rack 190 fixed to each piston 188 and a pinion gear 192 in gear-meshing engagement with each rack. As the pistons 188 move translationally along the chamber, the racks 190 correspondingly move translationally along the chamber. Translational movement of the racks 190 rotates the respective pinion gears 192. An end of a tether 134 is coupled to each of the pinion gears 192 such that as the pinion gears rotate the tethers wrap around or unwrap from the respective pinion gears. As a tether 134 wraps or is reeled around a pinion gear 192, the tether is effectively retracted into the actuator 132 about the pinion gear. In contrast, as a tether 134 unwraps from a pinion gear 192, the tether is effectively extended from the actuator 132. In one embodiment, pressurization of the chamber results in the tethers 134 wrapping around the pinion gears 192 to retract the tethers, and release or non-pressurization of the pressure in the chamber results in the tethers unwrapping from the pinion gears to extend the tethers. Because the chamber can be rapidly pressurized by the introduction of pressurized gas into the chamber, the tethers 134 can be rapidly retracted. Alternatively, if desired, pressurization of the chamber results in the tethers 134 unwrapping from the pinion gears 192 to extend the tethers, and release or non-pressurization of the pressure in the chamber results in the tethers wrapping around the pinion gears to retract the tethers.

Figure 14:
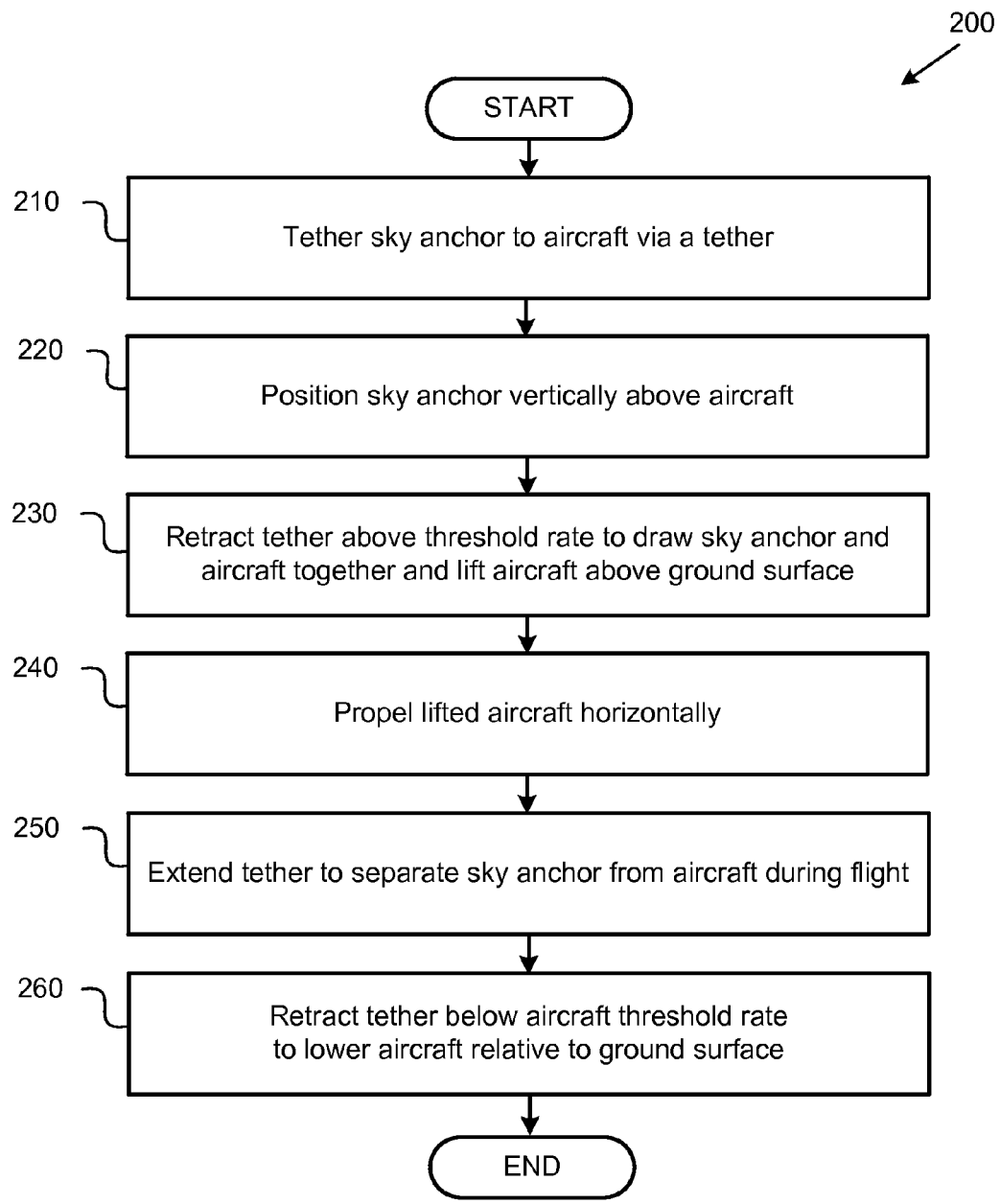
FIG. 14 is a schematic flow diagram of a method for flying an aircraft according to one embodiment.

According to one embodiment shown in FIG. 14, a method 200 for flying an aircraft includes tethering a sky crane to the aircraft via a tether at 210. The method 200 also includes positioning the sky crane vertically above the aircraft at 220. The aircraft is positioned vertically above the aircraft with the sky crane tethered to the aircraft and the aircraft on a ground surface. With the sky crane positioned vertically above the aircraft, the method 200 includes retracting the tether above a threshold rate to draw the sky crane and aircraft together and lift the aircraft above the ground surface at 230. After the tether is retracted, which terminates an aircraft launching operation, the method 200 may include propelling the lifted aircraft horizontally at 240 to initiate normal flight of the aircraft. The aircraft may be propelled with thrust generators on the aircraft. The method 200 additionally includes extending the tether to separate the sky crane from the aircraft during flight at 250 to terminate normal flight of the aircraft and initiate a landing operation. After extending the tethers at 250, the method includes 200 retracting the tether below the threshold rate to lower the aircraft relative to the ground surface at 260. The aircraft may be lowered until the aircraft is in contact with the ground surface, at which time the tether can be fully retracted.

Figure 15:
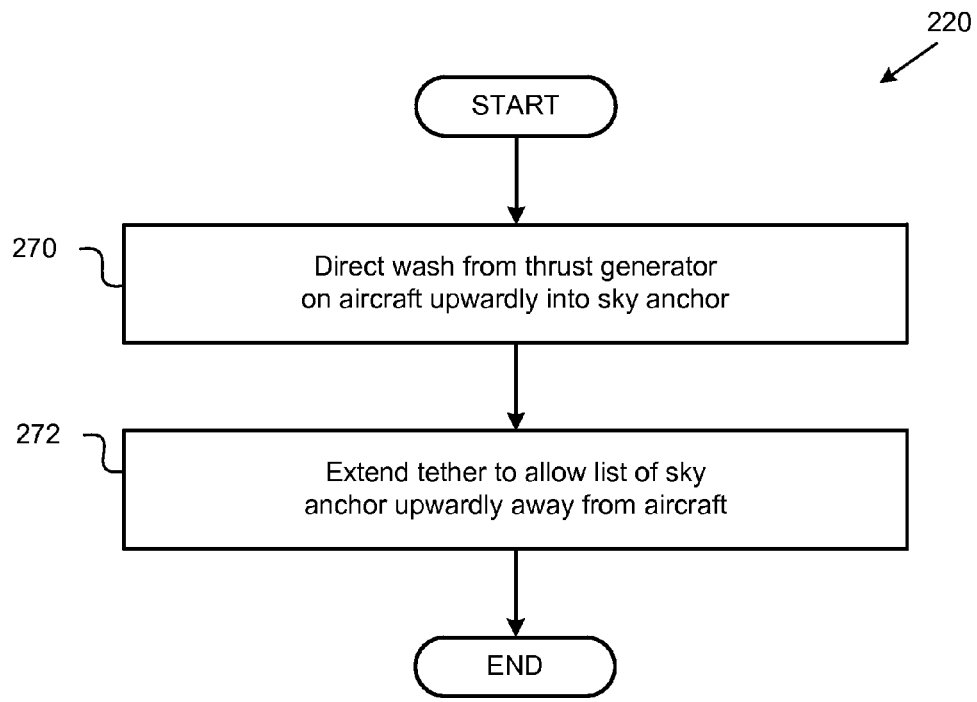
FIG. 15 is a schematic flow diagram of a method for positioning a sky crane vertically above an aircraft according to one embodiment.
Figure 16:
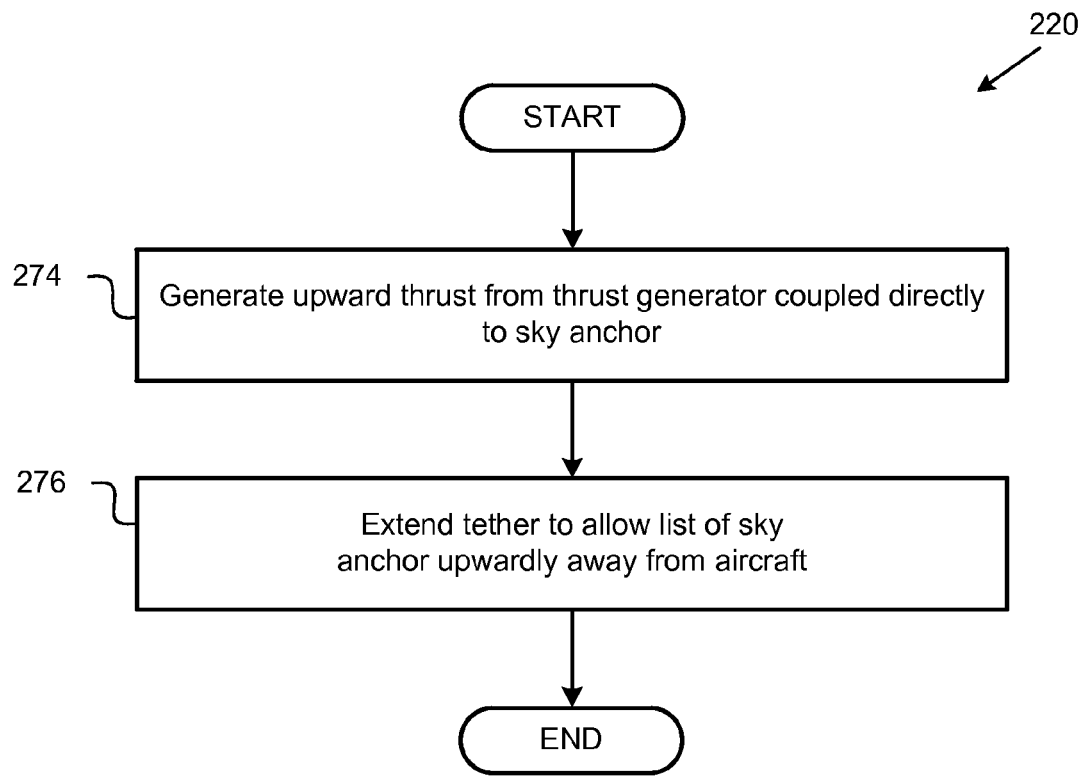
FIG. 16 is a schematic flow diagram of a method for positioning a sky crane vertically above an aircraft according to another embodiment.

Positioning the sky crane vertically above the aircraft at 220 can be accomplished in a variety of different ways. According to a first embodiment shown in FIG. 15, positioning the sky crane vertically above the aircraft at 220 is accomplished by directing wash, such as prop-wash, from a thrust generator on the aircraft upwardly into the sky crane at 270. Additionally, and according to the first embodiment, positioning the sky crane above the aircraft at 220 may include extending the tether to allow lift of the sky crane upwardly away from the aircraft at 272. According to a second embodiment shown in FIG. 16, positioning the sky crane vertically above the aircraft at 220 is accomplished by generating upward thrust from a thrust generator coupled directly to the sky crane at 274. Further, according to the second embodiment, positioning the sky crane above the aircraft at 220 may include extending the tether to allow lift of the sky crane upwardly away from the aircraft at 276.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An aircraft launch system, comprising:
a riser coupleable to an aircraft, the aircraft comprising at least one first thrust generator configured to generate a first upward lift on the aircraft and the riser comprising:
an actuator; and
a tether coupled to the actuator; and
a sky crane coupled to the tether, wherein the sky crane is configured to generate a second upward lift on the sky crane to lift the sky crane above the aircraft and to provide a downward drag to resist downward motion of the sky crane when lifted above the aircraft, wherein the sky crane comprises one of a rigid wing, a parafoil, or a lighter-than-air flotation device;
wherein the actuator is operable to retract the tether and draw together the sky crane and the aircraft during a take-off while the at least one first thrust generator generates the first upward lift on the aircraft and while at least one of the second upward lift is generated or the downward drag is provided;
wherein the first upward lift is less than a total weight of the aircraft and the second upward lift is less than the total weight of the aircraft; and
wherein a sum of the first upward lift and at least one of the second upward lift or the downward drag is greater than a combined weight of the aircraft, the riser, and the sky crane.

2. The aircraft launch system of claim 1, wherein the sky crane comprises the rigid wing.

3. The aircraft launch system of claim 2, wherein the sky crane further comprises a plurality of second thrust generators coupled to the rigid wing, the plurality of second thrust generators being configured to generate the second upward lift.

4. The aircraft launch system of claim 1, wherein the sky crane comprises the parafoil.

5. The aircraft launch system of claim 1, wherein the actuator retracts the tether at a rate between about 5 ft/s and about 15 ft/s.

6. The aircraft launch system of claim 1, wherein the actuator comprises a pneumatically-powered rack-and-pinion system.

7. The aircraft launch system of claim 1, wherein the tether comprises a plurality of wires.

8. An aircraft launch system, comprising:
an aircraft comprising at least one first thrust generator configured to generate a first upward lift on the aircraft;
a riser coupled to the aircraft, the riser comprising:
an actuator; and
a tether coupled to the actuator; and
a sky crane coupled to the tether, wherein the sky crane is configured to generate a second upward lift on the sky crane to lift the sky crane above the aircraft and to provide a downward drag to resist downward motion of the sky crane when lifted above the aircraft, and wherein the sky crane comprises one of a rigid wing, a parafoil, or a lighter-than-air flotation device;
wherein the actuator is operable to retract the tether and draw together the sky crane and the aircraft during a take-off while the at least one first thrust generator generates the first upward lift on the aircraft and while at least one of the second upward lift is generated or the downward drag is provided;
wherein the first upward lift is less than a total weight of the aircraft and the second upward lift is less than the total weight of the aircraft; and
wherein a sum of the first upward lift and at least one of the second upward lift or the downward drag is greater than a combined weight of the aircraft, the riser, and the sky crane.

9. The aircraft launch system of claim 8, wherein the aircraft further comprises:
a power supply; and
a controller, the controller operably coupled to the at least one first thrust generator.

10. The aircraft launch system of claim 8, wherein the aircraft comprises:
a fuselage; and
landing gear rotatably coupled to the fuselage via a lazy susan bearing.

11. The aircraft launch system of claim 8, wherein the sky crane comprises the rigid wing and a plurality of second thrust generators coupled to the rigid wing, the plurality of second thrust generators being configured to generate the second upward lift.

12. The aircraft launch system of claim 11, wherein the aircraft comprises a wing lock operable to lock the rigid wing to the aircraft.

13. The aircraft launch system of claim 11, wherein the second upward lift is greater than a weight of the rigid wing.

14. The aircraft launch system of claim 13, wherein the second upward lift is between about 110% and about 130% of the weight of the rigid wing and between about 15% and about 20% of the total weight of the aircraft.

15. The aircraft launch system of claim 8, wherein the actuator retracts the tether at a rate above a threshold rate, the threshold rate corresponding with a combined weight of the aircraft, riser, and sky crane being equal to a sum of the first upward lift and at least one of the second upward lift and the downward drag.

16. The aircraft launch system of claim 8, wherein the sky crane comprises the parafoil.

17. The aircraft launch system of claim 8, wherein the at least one first thrust generator of the aircraft is positionable to direct a wash of the at least one first thrust generator vertically into the sky crane, and is positionable to horizontally propel the aircraft.

18. A method for flying an aircraft, comprising:
tethering a sky crane to the aircraft via a tether, wherein the sky crane comprises one of a rigid wing, a parafoil, or a lighter-than-air flotation device;
positioning the sky crane in the air vertically above the aircraft while the aircraft is on a ground surface;
at least one of upwardly lifting the sky crane, with a first upward lift that is less than a total weight of the aircraft, or downwardly dragging the sky crane;
upwardly lifting the aircraft with a combination of the first upward lift and a second upward lift generated by the aircraft, wherein the second upward lift is less than the total weight of the aircraft; and
while or after upwardly lifting the aircraft and at least one of while or after upwardly lifting the sky crane or while downwardly dragging the sky crane, retracting the tether to draw the sky crane and aircraft together.

19. The method of claim 18, wherein positioning the sky crane in the air comprises extending the tether to allow the sky crane to lift upwardly away from the aircraft.

20. The method of claim 18, wherein positioning the sky crane in the air comprises directing a wash from at least one first thrust generator of the aircraft into the sky crane.

21. The method of claim 18, wherein positioning the sky crane in the air comprises generating thrust from at least one second thrust generator coupled directly to the sky crane.

22. The method of claim 18, wherein positioning the sky crane in the air comprises lifting the sky crane with wind.

23. The method of claim 18, wherein retracting the tether comprises retracting the tether faster than a downward decent rate of the sky crane.

24. The method of claim 18, further comprising, with the sky crane retracted to the aircraft, propelling the aircraft horizontally above the ground surface.

25. The method of claim 18, further comprising, with the aircraft vertically above the ground surface, extending the tether to separate the sky crane from the aircraft and lower the aircraft to the ground surface.

* * * * *